US011964407B2

United States Patent
Brosse et al.

(10) Patent No.: US 11,964,407 B2
(45) Date of Patent: Apr. 23, 2024

(54) FLAME-RETARDANT TREATMENT OF LIGNOCELLULOSIC MATERIALS, RESULTING FLAME-RETARDED LIGNOCELLULOSIC MATERIALS AND USES THEREOF

(71) Applicants: UNIVERSITE DE LORRAINE, Nancy (FR); INSTITUT MINES TELECOM, Palaiseau (FR); UNIVERSITE LIBANAISE, Beirut (LB)

(72) Inventors: Nicolas Brosse, Vezelise (FR); Romain Kapel, Saint Max (FR); Rodolphe Sonnier, Grenoble (FR); Roland El Hage, Aintoura el metn (LB); César Segovia, Epinal (FR); Karina Antoun, Vandoeuvre les Nancy (FR); Maria Moussa, Kobayat (LB)

(73) Assignees: UNIVERSITE DE LORRAINE, Nancy (FR); INSTITUT MINES TELECOM, Palaiseau (FR); UNIVERSITE LIBANAISE, Beirut (LB)

( * ) Notice: Subject to any disclaimer, the term of this patent is extended or adjusted under 35 U.S.C. 154(b) by 0 days.

(21) Appl. No.: 17/917,138

(22) PCT Filed: Apr. 8, 2021

(86) PCT No.: PCT/FR2021/050628
§ 371 (c)(1),
(2) Date: Oct. 5, 2022

(87) PCT Pub. No.: WO2021/205128
PCT Pub. Date: Oct. 14, 2021

(65) Prior Publication Data
US 2023/0182342 A1 Jun. 15, 2023

(30) Foreign Application Priority Data
Apr. 9, 2020 (FR) ...................... 2003600

(51) Int. Cl.
B27K 3/02 (2006.01)
B27K 3/34 (2006.01)
B27K 3/36 (2006.01)
B27K 3/38 (2006.01)
B27K 3/50 (2006.01)

(52) U.S. Cl.
CPC ............ *B27K 3/0207* (2013.01); *B27K 3/346* (2013.01); *B27K 3/36* (2013.01); *B27K 3/38* (2013.01); *B27K 3/50* (2013.01)

(58) Field of Classification Search
CPC .......... D21B 1/36; B27K 3/0207; B27K 3/50; B27K 3/346; B27K 3/36; B27K 3/38; B27K 2240/30
See application file for complete search history.

(56) References Cited

U.S. PATENT DOCUMENTS

| 4,751,034 A * | 6/1988 | DeLong ................. C08L 97/02 264/DIG. 80 |
| 5,718,802 A * | 2/1998 | Collier ..................... D21B 1/00 162/96 |
| 8,685,206 B2 * | 4/2014 | Sealey ................... D21H 17/10 162/158 |
| 10,092,021 B2 * | 10/2018 | Hruschka ................ A23J 1/006 |
| 2020/0056057 A1 * | 2/2020 | Nagarajan ........... D06M 13/292 |

FOREIGN PATENT DOCUMENTS

| CN | 110524657 A | 12/2019 |
| EP | 0346559 A2 | 12/1989 |
| JP | H11268008 A | 10/1999 |

OTHER PUBLICATIONS

International Search Report and Written Opinion dated Oct. 12, 2021 in corresponding International Application No. PCT/FR2021/050628 (with English Translation) ; 25 pages.
Dirk Van De Riet, "Evaluating Steam Explosion as Pre-treatment of Hemp Fibres for Use in High Value Products", Jun. 19, 2019 , pp. 1-40, Industrial Engineering and Management Product and Process Technology, Bacgekir Integration Project, University of groningen faculty of mathematics and natural sciences.
Anonymous, "Lignocellulosic Fiber", an overview, ScienceDirect Topics, Jan. 1, 2018, p. 1-2.
Pan L et al., "Extraction of phytic acid and preparation of protein isolates from rapeseed meal", Apr. 2011, abstract No. Database accession No. E20112714112594.
McMillan et al., "Lignin Deposition in Cotton Cells—Where is the lignin?" , J. Plant Biochem Physiol, vol. 1, No. 2, Jan. 1, 2013, p. 1-4.

(Continued)

*Primary Examiner* — Michael P Wieczorek
(74) *Attorney, Agent, or Firm* — Maier & Maier, PLLC (57) ABSTRACT

A flame retardant treatment of a lignocellulosic material, which includes: optionally steam exploding the lignocellulosic material, impregnating the optionally steam-exploded lignocellulosic material, in or with an aqueous solution, from 0.5% to 10% of phytic acid and from 1% to 30% of urea, based on the total weight of the aqueous solution, optionally drying of the impregnated lignocellulosic material, until the impregnated lignocellulosic material has a moisture content from 5% to 20% by weight, cooking the impregnated and optionally dried lignocellulosic material, the resulting flame-retarded lignocellulosic material including a phosphorous content originating from the phytic acid from 0.1% to 10% by weight. Also, the resulting flame-retarded lignocellulosic material and the use thereof for manufacturing flame-retarded composite materials based on plant fibres, woven or nonwoven flame-retarded flexible materials based on plant fibres, and particularly textiles, flame-retarded materials based on wood fibres and/or on wood particles, and particularly flame-retarded wood panels.

18 Claims, 5 Drawing Sheets

(56) References Cited

OTHER PUBLICATIONS

Zhou et al., "Further improvement of flame retardancy of polyaniline-depositedpaper composite through using phytic acid as dopant or co-dopant", Carbohydrate Polymers, 115 (2015), p. 670-676.

Costes et al., "Cellulose/phosphorus combinations for sustainable fire retarded polylactide", European Polymer Journal, 74 (2016), p. 218-228.

Gao et al., "A novel bio-based flame retardant for polypropylene from phytic acid", Polymer Degradation and Stability, 161 (2019), p. 298-308.

Liu et al., "Durable flame retardant cellulosic fibers modified with novel, facile and efficient phytic acid-based finishing agent", Cellulose, 25, Nov. 17, 2017, p. 799-811.

\* cited by examiner

FLAME-RETARDANT TREATMENT OF LIGNOCELLULOSIC MATERIALS, RESULTING FLAME-RETARDED LIGNOCELLULOSIC MATERIALS AND USES THEREOF

FIELD

The present disclosure relates to the field of chemistry and more particularly to the field of flame retardancy. The invention notably relates to a new biobased and solvent-free flame retardancy process. The invention relates more particularly to a process for the flame retardancy of lignocellulosic materials by grafting phytic acid onto said lignocellulosic materials. The invention also relates to the novel flame-retarded lignocellulosic materials thus obtained and to the uses thereof in the manufacture of hard (such as panels) or flexible (woven or nonwoven) flame-retarded materials.

BACKGROUND

The term "flame retardancy" refers to a set of treatments performed to improve the fire resistance of a material. Flame retardancy thus makes it possible to render a naturally flammable material noncombustible or less combustible by impregnating it with flame-retardant substances.

Flame retardancy processes using phytic acid have already been described in the prior art.

For example, the publication by Yang Zhou et al. (1) describes that phytic acid is an excellent dopant for improving the fire resistance of paper-based composites. Phytic acid is used as a mixture (ungrafted) in a synthetic polymer (polyaniline). The latter is used as a surface treatment on paper to give it electrical conductivity and flame-retardant properties.

The publication by Lucie Costes et al. (2) investigates the effects of different cellulose/phosphorus combinations on the flame-retardant properties of polylactide (PLA), which is a synthetic polymer whose raw material is biobased. The tests showed that the combinations of phosphorylated microcrystalline cellulose (MCC-P)/aluminum phytate or nanocrystalline cellulose (NCC)/aluminum phytate gave good results. In said publication, cellulose is chemically modified in urea melted at 140° C. with phosphoric acid, washed with sodium hydroxide solution and then precipitated from methanol. Composites based on PLA, modified cellulose and aluminum salt of phytic acid (ungrafted) were produced by extrusion.

The publication by Yu-Yang Gao et al. (3) describes the use of a salt of phytic acid, obtained by reaction of phytic acid and piperazine, with polypropylene to improve the fire resistance of the latter. The phytic acid is used with a synthetic amine and added as an additive (without grafting) to a petroleum-based polymer.

The publication by Xiao-hui Liu et al. (4) describes the use of a phytic acid ammonium (PAA) salt to improve the fire resistance of "Lyocell" fibers (which are regenerated cellulose fibers). In said publication, phytic acid is first combined with urea and then precipitated from N,N-dimethylformamide. The salt obtained is reacted under heat with regenerated cellulose in the presence of dicyandiamide in water.

However, the processes described in these publications are not biobased since they use solvents and/or chemical compounds during the preparation of the flame-retarded material or since the starting material to be flame-retarded is often a chemically synthesized compound. In addition, the phytic acid is generally not covalently grafted onto the flame-retarded material and is only present on the surface of the flame-retarded material.

SUMMARY

There is thus still a need to develop novel biobased flame retardancy processes, notably to meet an increasingly pressing demand from industry for fire-resistant, nontoxic biobased materials.

One of the aims of the invention is thus to develop a biobased, solvent-free process. The term "biobased process" means a process that uses biobased material as the starting material, but if possible also as the flame-retardant agent.

A biobased material is a material derived from plant or animal biomass. The term "biomass" refers to all living matter, i.e. matter of biological origin, with the exception of geological or fossil matter. Biomass is essentially composed of carbon (about 50%), oxygen (about 40%), hydrogen (about 6%), a small amount of nitrogen (0.4% to 1.2%) and minerals (calcium, silicon, potassium).

According to the invention, the starting material to be flame-retarded, namely a lignocellulosic material, is biobased.

The term "lignocellulosic material" means a material consisting of three major components: cellulose, hemicelluloses and lignin. Lignocellulosic material represents the vast majority of biomass. On average, lignocellulosic material contains 40-60% cellulose, 20-40% hemicelluloses and 10-25% lignin. The flame-retarded lignocellulosic material according to the process of the invention thus contains such proportions of cellulose, hemicellulose and lignin.

According to one embodiment of the invention, the flame-retardant agent, namely phytic acid, is biobased.

A subject of the present invention is more particularly a process for the flame retardancy of a lignocellulosic material, characterized in that it comprises the following steps:
  optionally steam explosion of the lignocellulosic material,
  impregnation of the lignocellulosic material, optionally steam-exploded, in or with an aqueous solution comprising from 0.5% to 10% phytic acid and from 1% to 30% urea, and preferably from 3% to 7% phytic acid and from 15% to 22% urea, said percentages being expressed by mass relative to the total mass of the aqueous solution,
  optionally drying the impregnated lignocellulosic material until it has a moisture content ranging from 5% to 20%, said percentages being expressed by mass relative to the total mass of the impregnated lignocellulosic material,
  cooking the impregnated and optionally dried lignocellulosic material,
the flame-retarded lignocellulosic material thus obtained comprising a content of phosphorus originating from phytic acid ranging from 0.1% to 10%, preferably ranging from 0.3% to 3%, said percentages being expressed by mass relative to the total mass of the flame-retarded lignocellulosic material.

As regards the percentages of phytic acid and urea in the aqueous solution as defined above, mention may also be made of 0.5% to 7% phytic acid and 1% to 22% urea, said percentages being expressed by mass relative to the total mass of the aqueous solution.

According to one embodiment of the invention, the lignocellulosic material used in the flame retardancy process is in the form of fibers and/or particles. In the invention, the term "fibers" refers more particularly to natural plant fibers and the term "particles" refers to wood particles. Natural plant fibers include different categories of fibers depending on their botanical origin (wood or plants) and their location in the plant. For cultivated plants, a distinction is made between bast fibers, which are extracted from the outer part of the stem in the bast, fibers extracted from the trunk or stems, fibers extracted from the leaves, fibers extracted from the seeds or fruits, and straws.

According to another embodiment of the invention, the lignocellulosic material more particularly used in the process of the invention is in the form of plant fibers such as wood fibers and/or plant fibers, and in particular bast fibers, or in the form of wood particles.

The wood and/or plant fibers have a diameter of less than or equal to 500 µm and a length ranging from 1 mm to 50 cm. As an indication, bast fibers can be very long (up to 50 cm), whereas wood fibers are much shorter and are generally only a few millimetres long.

For the purposes of the invention, the term wood "particles" refers to wood fragments and/or sawdust. The wood particles may have various shapes and when they are spherical they have a diameter of less than 5 mm.

According to one embodiment of the invention:
the plant fibers are more particularly bast fibers chosen from the group comprising hemp, flax, ramie and jute fibers,
the wood fibers and/or particles are more particularly chosen from the group comprising spruce, ash, birch, poplar, beech and oak fibers and/or particles.

According to an advantageous embodiment of the invention, the lignocellulosic material to be flame-retarded is subjected beforehand to steam explosion. Thus, the lignocellulosic material used at the start of the flame retardancy process is chosen from the group comprising steam-exploded plant fibers, and in particular steam-exploded bast fibers, steam-exploded wood fibers and steam-exploded wood particles.

Steam explosion is a thermo-mechanical-chemical treatment which consists in heating the lignocellulosic material to high temperature (160-270° C.) by injecting saturated steam under high pressure (10-50 bar) for a short time (a few seconds to a few minutes) and then performing an abrupt expansion to atmospheric pressure. This results in a significant destructuring of the lignocellulosic material.

A steam explosion facility consists of a steam generator which feeds a reactor that will be subjected to a sudden depressurization. During the depressurization, the material is ejected from the reactor and is recovered in a splitter.

The steam explosion treatment allows the lignocellulosic material to be fractionated so as to upgrade the various polymer fractions of which the lignocellulosic material is composed. More particularly, steam explosion reduces the hemicellulose content of the lignocellulosic material.

This treatment also makes it possible to reduce the size of the plant fibers and/or wood particles, so as to produce micro- and nanofibers and/or micro- and nanoparticles.

According to the process of the invention, the steam-exploded plant fibers, and in particular the steam-exploded bast fibers, have a diameter of less than 100 µm, and preferably less than 50 µm, and a length ranging from 1 cm to 10 cm, and preferably from 3 cm to 5 cm.

The steam-exploded wood particles have, when they are spherical, a diameter of less than 3 mm.

According to another embodiment of the invention, the lignocellulosic material to be flame-retarded, which has preferably been steam-exploded beforehand, is bleached.

The purpose of bleaching is to delignify the lignocellulosic material, i.e. to remove all or part of the lignin from the lignocellulosic material, which results in a profound modification of the fiber and the production of a white lignocellulosic material. The bleaching of the cellulosic material is performed using chlorite ions or a peroxide.

The lignocellulosic material used at the start of the flame retardancy process of the invention may thus be:
"raw" (i.e. it has not undergone any steam explosion and/or bleaching),
"exploded" (it has undergone steam explosion but no bleaching),
"bleached" (it has undergone bleaching but no steam explosion),
"bleached-exploded" (it has undergone steam explosion and bleaching).

When the lignocellulosic material is bleached-exploded, it is subjected first to steam explosion and then to bleaching.

Apart from any steam explosion or bleaching, the lignocellulosic material used at the start of the flame retardancy process of the invention has not undergone any other chemical treatment.

According to another embodiment of the invention, the phytic acid is obtained from rapeseed oil cake.

The term "oil cake" denotes the solid residue obtained after the oil has been extracted from the seeds or fruits of oil-yielding plants. Oil cakes contain relatively high proportions of phytic acid (3% to 6%), which is a natural reserve of phosphorus for the plant seeds.

Rapeseed is the most widely cultivated oil-yielding crop in France. Rapeseed oil cake is an interesting industrial raw material on account of its plant protein content and its attractive price. It is thus used in animal feed. However, phytic acid is an anti-nutritive agent which has a negative impact on the quality of the oil cake for animal feed applications.

Extracting phytic acid from rapeseed oil cake (which contains 5-6% phytic acid) is thus an excellent way of both upgrading the rapeseed oil cake in the feed chain and providing phytic acid.

According to the invention, the process for extracting phytic acid from rapeseed oil cake comprises the following steps:
placing the rapeseed oil cake in contact with an acidic aqueous solution with stirring,
centrifugation and recovery of the aqueous phase,
ultrafiltration of the aqueous phase,
recovery of the aqueous phase obtained from the ultrafiltration,
freeze-drying of the aqueous phase obtained from the ultrafiltration to obtain a freeze-dried product comprising phytic acid.

The phytic acid lyophilizate thus obtained is then used in combination with urea in order to prepare an aqueous solution comprising from 0.5% to 10% phytic acid and from 1% to 30% urea, and preferably from 3% to 7% phytic acid and from 15% to 22% urea, said percentages being expressed by mass relative to the total mass of the aqueous solution, said aqueous solution being used in the impregnation step of the process of the invention. Concentrations of 0.5% to 7% phytic acid and 1% to 22% urea, said percentages being expressed by mass relative to the total mass of the aqueous solution, are also suitable in the context of the invention.

The flame-retardant agent of the process of the invention is phytic acid. However, it is used in combination with urea, which notably has the role of increasing the accessibility of the cellulose (originating from the lignocellulosic material) by swelling and of protecting the lignocellulosic material from degradation during the cooking step.

According to an advantageous embodiment of the process of the invention, the step of impregnating the lignocellulosic material is performed at room temperature:
  by soaking in the aqueous solution of phytic acid and urea, or
  by spraying with the aqueous solution of phytic acid and urea, said aqueous solution of phytic acid and urea being as defined above.

According to the invention, when the impregnation is performed by soaking, the impregnation time is from 5 minutes to 1 hour, and preferably from 15 minutes to 1 hour.

In the case of impregnation by soaking, the process of the invention also comprises, on conclusion of the impregnation step, and before the drying step, a step of recovery, preferably by filtering, of the impregnated lignocellulosic material.

According to an advantageous embodiment of the invention, when the impregnation step is performed by spraying, it is then not necessary to perform a drying step before the cooking step. Specifically, the lignocellulosic material obtained after the spray impregnation step has a moisture content ranging from 5% to 20%.

When the impregnation step is performed by soaking, it is then necessary to perform a drying step before the cooking step.

The step of drying of the impregnated lignocellulosic material is performed at a temperature ranging from 20° C. to 60° C., and preferably from 40° C. to 60° C., for a time ranging from 5 minutes to 18 hours, and preferably ranging from 15 minutes to 30 minutes.

As an indication, the drying is performed in an oven or by forced air.

The step of cooking of the impregnated and optionally dried lignocellulosic material is performed at a temperature ranging from 140° C. to 200° C., and preferably from 140° C. to 160° C., for a time ranging from 15 minutes to 5 hours, and preferably from 30 minutes to 2 hours.

The cooking step may be performed in a continuous tunnel oven. The continuous tunnel oven is a conveyor oven or a through oven allowing continuous cooking, the lignocellulosic material being conveyed through the oven on a belt.

Thus, according to another advantageous embodiment of the process of the invention, the drying and cooking steps are performed continuously.

According to yet another embodiment, the process of the invention comprises, on conclusion of the cooking step, a washing and/or filtration step. The washing and/or filtration step makes it possible to remove the molecules not attached by strong bonding (i.e. by covalent bonding) on the lignocellulosic material.

The process of the invention advantageously allows covalent grafting of the phosphorus originating from the phytic acid to both the surface and the core of the lignocellulosic material. The process of the invention is thus also characterized in that, in the flame-retarded lignocellulosic material, the phosphorus originating from the phytic acid is grafted by covalent bonding to the surface and to the core of said flame-retarded lignocellulosic material.

According to an advantageous embodiment of the invention, the flame retardancy process of the invention does not color the flame-retarded lignocellulosic material.

According to another advantageous embodiment, the process of the invention is also characterized in that it is solvent-free. It does not require the use of water either.

Advantageously, the process of the invention only involves impregnation, drying and cooking steps. There is no solution step. With the possibility of continuous treatment, it is also easy to industrialize. The flame retardancy process of the invention is environmentally friendly by using biobased, inert and nontoxic materials. It is also easy to perform and economical. It also makes it possible to upgrade agricultural co-products that are currently sparingly exploited, namely phytic acid obtained from rapeseed oil cake.

The lignocellulosic material obtained according to the flame retardancy process of the invention no longer ignites, it no longer allows the flame to spread and it chars when burned.

According to another aspect of the invention, a flame-retarded lignocellulosic material which may be obtained according to the process as described above is proposed.

A subject of the present invention is also a flame-retarded lignocellulosic material, characterized in that it comprises a phosphorus content ranging from 0.1% to 10%, preferably ranging from 0.3% to 3%, said percentages being expressed by mass relative to the total mass of the flame-retarded lignocellulosic material, and in that the phosphorus is grafted by covalent bonding to the surface and to the core of said flame-retarded lignocellulosic material.

The flame-retarded lignocellulosic material as defined above is further characterized in that it has a Total Heat Release ("THR") ranging from 0.5 to 11 KJ/g as measured with a combustion microcalorimeter according to the standard ASTM D7309, said standard referring to pyrolysis in an anaerobic environment at 1 K/s up to 750° C.

The flame-retarded lignocellulosic material of the invention, as defined above, is preferably obtained from a lignocellulosic material chosen from the group comprising plant fibers (bast fibers such as hemp, flax, ramie and jute fibers), wood fibers, wood particles (spruce, ash, birch, poplar, beech, oak) and mixtures thereof.

According to the invention, the flame-retarded lignocellulosic material of the invention is preferably obtained from steam-exploded lignocellulosic material.

According to another aspect of the invention, it is proposed to use a flame-retarded lignocellulosic material as described above or as obtained according to the process as described above.

A subject of the present invention is thus also the use of a flame-retarded lignocellulosic material as described above or as obtained according to the process as described above, for the manufacture of:
  flame-retarded composite materials based on plant fibers,
  flexible flame-retarded woven or nonwoven materials based on plant fibers, and notably textiles,
  flame-retarded materials based on wood fibers and/or wood particles, and notably flame-retarded wood panels.

As examples of flame-retarded composite materials based on plant fibers, mention may be made of flame-retarded composite materials based on plant fibers (and notably wood fibers) and thermoplastic resins. Such composite materials have applications in the building and transport sectors.

As examples of flexible woven flame-retarded materials based on plant fibers, mention may be made of furnishing textiles, technical textiles for the home, technical textiles (sportswear, for professionals (firemen etc.)).

As examples of flexible nonwoven flame-retarded materials based on plant fibers, mention may be made of geotextiles, and flexible membranes for construction or transportation.

According to an advantageous embodiment of the invention, when the flame-retarded lignocellulosic material is obtained from steam-exploded wood fibers and/or steam-exploded wood particles, said flame-retarded lignocellulosic material may then advantageously be used to produce glueless and resin-free flame-retardant wood panels by simply pressing the lignocellulosic material. The invention is thus also relates to the use as defined above, for the manufacture of wood panels, characterized in that the flame-retarded lignocellulosic material is obtained from steam-exploded wood fibers and/or steam-exploded wood particles, and in that the flame-retardant wood panels obtained are free of glue and resin.

A subject of the present invention is also glue- and resin-free flame-retardant wood panels made from a flame-retarded lignocellulosic material which is itself obtained from steam-exploded wood fibers and/or steam-exploded wood particles. Such panels are thus entirely environmentally friendly.

BRIEF DESCRIPTION OF THE DRAWINGS

Other features, details and advantages will appear on reading the description detailed below, and on analyzing the attached drawings, in which.

Curve 1 relates to control hemp fibers, which are not flame-retarded (and thus comprise 0% phosphorus content).

Curve 2 relates to hemp fibers flame-retarded according to the process of the invention, which comprise a phosphorus content of 0.31%.

Curve 3 relates to flame-retarded hemp fibers according to the invention, which comprise a phosphorus content of 0.49%.

Curve 4 relates to flame-retarded hemp fibers according to the invention, which comprise a phosphorus content of 0.62%.

Curve 5 relates to flame-retarded hemp fibers according to the invention, which comprise a phosphorus content of 2.14%.

Curve 1 relates to control hemp fibers, which are not flame-retarded (and thus comprise 0% phosphorus content).

Curve 2 relates to flame-retarded hemp fibers according to the invention, which comprise a phosphorus content of 0.12%.

Curve 3 relates to flame-retarded hemp fibers according to the invention, which comprise a phosphorus content of 0.33%.

Curve 4 relates to flame-retarded hemp fibers according to the invention, which comprise a phosphorus content of 0.66%.

Curve 5 relates to flame-retarded hemp fibers according to the invention, which comprise a phosphorus content of 1.53%.

Curve 6 relates to flame-retarded hemp fibers according to the invention, which comprise a phosphorus content of 1.97%.

Curve 7 relates to flame-retarded hemp fibers according to the invention, which comprise a phosphorus content of 2.40%.

Curve 1 relates to control hemp fibers, which are not flame-retarded. These control fibers comprise a phosphorus content of 0.07%.

Curve 2 relates to flame-retarded hemp fibers according to the invention, which comprise a phosphorus content of 0.15%.

Curve 3 relates to flame-retarded hemp fibers according to the invention, which comprise a phosphorus content of 0.24%.

Curve 4 relates to flame-retarded hemp fibers according to the invention, which comprise a phosphorus content of 0.53%.

Curve 5 relates to flame-retarded hemp fibers according to the invention, which comprise a phosphorus content of 0.93%.

Curve 6 relates to flame-retarded hemp fibers according to the invention, which comprise a phosphorus content of 1.48%.

Curve 7 relates to flame-retarded hemp fibers according to the invention, which comprise a phosphorus content of 1.83%.

Curve 1 relates to raw control hemp fibers, which are not flame-retarded (and which comprise a phosphorus content of 0%).

Curve 2 relates to flame-retarded hemp fibers according to the invention, using 1.57% phytic acid and 5% urea.

Curve 3 relates to flame-retarded hemp fibers according to the invention, using 3.13% phytic acid and 10% urea.

Curve 4 relates to flame-retarded hemp fibers according to the invention, using 6.26% phytic acid and 20% urea.

Curve 1 relates to raw hemp fibers, flame-retarded according to the invention, using 3.13% phytic acid and 10% urea.

Curve 2 relates to exploded and unbleached hemp fibers, flame-retarded according to the invention, using 3.13% phytic acid and 10% urea.

Curve 3 relates to exploded and bleached hemp fibers, flame-retarded according to the invention, using 3.13% phytic acid and 10% urea.

Curve 1 relates to steam-exploded spruce particles (which have not been subjected to any treatment other than steam explosion), which comprise a phosphorus content of 0%.

Curve 2 relates to steam-exploded spruce particles which have subsequently been subjected to a drying and cooking step, respectively, as described in the process of the invention but which have not been subjected to a step of impregnation with a solution comprising phytic acid. Said spruce particles comprise a phosphorus content of 0%.

Curve 3 relates to steam-exploded spruce particles, flame-retarded according to the process of the invention, which comprise a phosphorus content of 2.14%.

Curve 1 relates to steam-exploded spruce particles (control: particles not flame-retarded).

Curve 2 relates to steam-exploded spruce particles, in which the impregnation step of the flame retardancy process is performed by spraying with 160 mL of an aqueous solution comprising 10% phytic acid and 10% urea, and in which the cooking time of the impregnated spruce particles is 30 minutes.

Curve 3 relates to steam-exploded spruce particles, in which the impregnation step of the flame retardancy process is performed by soaking with 400 mL of an aqueous solution comprising 6.26% phytic acid and 20% urea, and in which the cooking time of the impregnated and dried spruce particles is 120 minutes.

DETAILED DESCRIPTION

The drawings and description below are in essence definite features. Therefore, they may not only serve to further the understanding of the present disclosure, but also contribute to its definition, where appropriate.

EXAMPLES

Example 1

Preparation of the Impregnation Solutions Based on Phytic Acid

Extraction of Phytic Acid from Rapeseed Oil Cake

The rapeseed oil cake meal, which is used as raw material, is suspended in an aqueous solution with a pH of 2 (±0.05) stabilized by the alternative addition of sodium chloride and hydrogen chloride.

The extraction is performed at room temperature by applying mechanical stirring at a speed of 300 rpm for one hour. The aqueous phase is then separated from the solid phase at room temperature by centrifugation at a speed of 15 000 rpm for 30 minutes followed by a filtration step.

The filtrate obtained is purified using a semiautomatic ultrafiltration system (Akta Flux 6, GE Healthcare, Chicago, IL, USA), using hollow fibers with a cutoff threshold of 3 kDa and a surface area of 4800 cm². The filtrate is more particularly added to the retentate tank and circulated for 10 min while keeping the trans-membrane pressure at 1.5 bar, the feed rate at 2 L·min$^{-1}$ and the stirring speed at 50 rpm, and then lyophilized. A lyophilizate comprising phytic acid is thus obtained and is used in the next step of preparation of the impregnation solutions.

Preparation of Aqueous Solutions of Phytic Acid and Urea

Aqueous solutions of phytic acid and urea are prepared from the phytic acid lyophilizate obtained in the previous step and urea.

The urea used is sold by the company Sigma-France in the form of urea granules of purity≥99.5% (ReagentPlus®).

Four aqueous impregnation solutions comprising various mass percentages of phytic acid and urea are prepared, namely:
1/ a solution comprising 0.63% phytic acid and 2% urea,
2/ a solution comprising 1.57% phytic acid and 5% urea,
3/ a solution comprising 3.13% phytic acid and 10% urea,
4/ a solution comprising 6.26% phytic acid and 20% urea.

As already indicated, the percentages are expressed by mass relative to the total mass of the aqueous impregnation solution.

The solution described in 1/ is prepared by dissolving 2 g of urea and 7.3 g of phytic acid lyophilizate in a volume of 100 mL of water.

The solution described in 2/ is prepared by dissolving 5 g of urea and 18.2 g of phytic acid lyophilizate in a volume of 100 mL of water.

The solution described in 3/ is prepared by dissolving 10 g of urea and 36.4 g of phytic acid lyophilizate in a volume of 100 mL of water.

The solution described in 4/ is prepared by dissolving 20 g of urea and 72 g of phytic acid lyophilizate in a volume of 100 mL of water.

Other aqueous solutions of phytic acid and urea are prepared from commercial phytic acid and urea.

The phytic acid used is the product sold by the company Sigma-Aldrich under the name "phytic acid solution". More particularly, it is a solution with a density of 1.432 g/mL and a mass concentration of phytic acid of 50%.

The urea used is the product described in the previous paragraph.

Seven aqueous impregnation solutions comprising various mass percentages of phytic acid and urea are prepared, namely:
1/ a solution comprising 0.00% phytic acid and 0% urea,
2/ a solution comprising 0.32% phytic acid and 1% urea,
3/ a solution comprising 0.63% phytic acid and 2% urea,
4/ a solution comprising 1.57% phytic acid and 5% urea,
5/ a solution comprising 3.13% phytic acid and 10% urea,
6/ a solution comprising 4.70% phytic acid and 15% urea,
7/ a solution comprising 6.26% phytic acid and 20% urea.

As already indicated, the percentages are expressed by mass relative to the total mass of the aqueous impregnation solution.

The solution described in 1/ is a water solution with a volume of 100 mL.

The solution described in 2/ is prepared by dissolving 1 g of urea and 0.44 mL of phytic acid in a volume of 100 mL of water.

The solution described in 3/ is prepared by dissolving 2 g of urea and 0.88 mL of phytic acid in a volume of 100 mL of water.

The solution described in 4/ is prepared by dissolving 5 g of urea and 2.19 mL of phytic acid in a volume of 100 mL of water.

The solution described in 5/ is prepared by dissolving 10 g of urea and 4.37 mL of phytic acid in a volume of 100 mL of water.

The solution described in 6/ is prepared by dissolving 15 g of urea and 6.56 mL of phytic acid in a volume of 100 mL of water.

The solution described in 7/ is prepared by dissolving 20 g of urea and 8.74 mL of phytic acid in a volume of 100 mL of water.

Example 2

Process for the Flame Retardancy of Hemp Fibers which have Undergone a Steam Explosion and Bleaching Treatment Materials The industrial hemp (*Cannabis sativa* L.) fibers used in this study were grown at La Chanvrière, in Bar-sur-Aube, France. The stems were cut a few centimeters from the ground and harvested without retting in the fall of 2016. The fibers were isolated, dried, and stored in a dry, well-ventilated area throughout the study.

The sodium hydroxide NaOH used in the steam explosion treatment was purchased from the company Sigma-France.

The aqueous solutions of phytic acid and urea used are as described in Example 1.

Steam Explosion Treatment of Hemp Fibers

The refining of hemp fibers by steam explosion consists in impregnating raw hemp fibers with an aqueous solution comprising 8% sodium hydroxide for 15 hours at room temperature and without stirring.

The fibers are then steam-exploded at 190° C. for 4 minutes. After the explosion, the fibers are washed with distilled water to remove all traces of sodium hydroxide and then dried in a fume cupboard for 24 hours.

Bleaching Treatment of the Exploded Fibers

The bleached hemp fibers are obtained using a delignification treatment based on acetic acid and sodium chlorite.

The exploded fibers obtained in the previous step are placed in a reflux flask with deionized water (83.3 mL/g fiber), glacial acetic acid (1.998 mL/g fiber) and sodium chlorite (1.998 mg/g fiber). The mixture is heated at 70° C. for 6 hours. The addition of sodium chlorite and glacial acetic acid is repeated twice. A whitish solid residue consisting essentially of holocellulose is then obtained. After cooling, the bleached fibers are filtered under vacuum and washed excessively with deionized water until the pH of the filtrate is neutral. The fibers are dried overnight at room temperature.

Grafting of Phytic Acid According to the Process of the Invention 10 g of hemp fibers thus exploded and bleached are impregnated in 100 mL of each of the four aqueous solutions of phytic acid and urea as defined in Example 1, from which the phytic acid is extracted from the rapeseed oil cakes, without stirring, for one hour at room temperature.

The impregnated fibers are then dried in a ventilated oven at a temperature of 60° C. for 15 hours until the fibers have a moisture content of 30%.

The grafting step is completed by cooking the dried fibers at a temperature of 150° C. for 2 hours in a continuous tunnel oven.

At the end of the treatment, the phosphorylated fibers are washed thoroughly with distilled water and then filtered under vacuum, followed by drying in a fume cupboard for 48 hours.

Elemental Analyses

Inductively Coupled Plasma Mass Spectrometry (ICP-MS) is used for the determination of the content of phosphorus element in the samples.

0.15 g of the grafted fibers as obtained according to the flame retardancy process of the invention is mixed with 5 mL of a nitric acid solution in a glass tube. Several tubes are thus prepared and then placed in a mineralization unit (Ultrawave system) and left to react for 30 min at 230° C. and 110 bar. The samples are then left for 10 min at this temperature and pressure until mineralization is complete. After mineralization, the samples are diluted with 50 mL of demineralized water and filtered, followed by analysis.

For the ICP analysis, a standard range of 50, 100, 500, 1000, 5000, 10 000 and 20 000 ppb (parts per billion) is prepared using a commercial mono-elemental phosphorus solution of 1000 ppm concentration. A blank (water+10% nitric acid) is injected before the passage of the various standards prepared. Several wavelengths are chosen for the analysis of phosphorus, presenting the least possible interference with the other elements that might be found in the sample. A calibration curve is thus plotted by analyzing the various standards. The samples to be analyzed are then injected and if they are not in the correct range of the standards, they can be rediluted. With the values obtained by means of the ICP, the phosphorus masses are traced back to what was weighed in each tube during the mineralizations.

A "Thermo Finnigan Flash EA 112 Series" is used for the elemental analysis of nitrogen, carbon, oxygen and hydrogen. The combustion of the samples (1.5 mg) to be analyzed is performed at high temperature (1000° C.) in the presence of tungstic anhydride, under an oxidizing atmosphere for 15 s. This decomposition gives $CO_2$, $H_2O$, $SO_2$ and $NO_x$ which is reduced to $N_2$ in the presence of copper. These gaseous products are then analyzed by gas chromatography. The results are recorded and analyzed by the "Eager 300" software which calculates directly the percentage of each element present in the compound.

Combustion microcalorimetry (PCFC: "Pyrolysis Combustion Flow calorimetry")

A combustion microcalorimeter (Fire Testing Technology) is used to study the fire behavior of the samples of the invention at the micrometer scale (2-4 mg). The samples are pyrolyzed with a temperature ramp of 1° C./s under a stream of nitrogen from 90 to 750° C. (anaerobic pyrolysis—method A according to the standard ASTM D7309). The pyrolysis gases are transported to a combustion chamber in the presence of a stream of $N_2/O_2$ (80/20). Under such conditions, all the gases are fully oxidized. The heat release rate (HRR) is calculated according to the Huggett equation. According to this equation, 1 kg of oxygen consumed corresponds to 13.1 MJ of heat release. Each test is performed twice to ensure reproducibility of the measurements. The peak heat release rate (pHRR), the temperature at pHRR (TpHRR), the total heat release (THR), the heat of combustion ($\Delta h$), and the final residue content (%) are determined.

Flame Tests on Flame-Retarded Hemp Fibers

A non-standardized fire test is performed to evaluate the flammability of the fibers in a quick and easy manner. Raw and treated fibers previously glued vertically on an aluminum support are ignited with a lighter.

Three behaviors are thus discriminated: flame propagation without residue (ignition), flame propagation with residue formation and no flame propagation (self-extinguishing ability). The residue is also weighed after complete combustion. The initial mass of each fiber is subtracted from the mass of the residue to calculate the percentage of mass loss (% residue).

Results

The results obtained are shown in Table 1 below and in FIGS. 1 and 2.

"Phytic acid m/m" refers to the mass percentage of phytic acid used in the aqueous solution for fiber impregnation.

"Cooking time" refers to the duration of the cooking performed in the grafting step of the flame retardancy process of the invention.

"% P" refers to the percentage of phosphorus covalently grafted to the flame-retarded lignocellulosic material (hemp fibers in this example).

"% N" refers to the percentage of nitrogen originating from urea.

"HRR" refers to the heat release rate (W/g).

"pHRR" is the maximum value of the peak HRR (W/g).

"TpHRR" is the peak temperature (° C.).

"THR" refers to the total heat release (kJ/g).

"% Residue" refers to the percentage of charred residue after the fire-retarded lignocellulosic material (hemp fibers in this example) has been burned.

TABLE 1

| Phytic acid (m/m) | Cooking time (hours) | % P | % N | TpHRR (° C.) | pHRR (W/g) | THR (kJ/g) | % residue |
|---|---|---|---|---|---|---|---|
| 0.00 | 2 | 0.00 | 0.05 | 359.5 | 248.0 | 13.8 | 1.8 |
| 0.63 | 2 | 0.31 | 0.05 | 279.5 | 104.5 | 7.4 | 18.5 |
| 1.57 | 2 | 0.49 | 0.05 | 273.5 | 91.5 | 5.0 | 22.5 |
| 3.13 | 2 | 0.62 | 0.16 | 268.0 | 82.5 | 4.5 | 25.4 |
| 6.26 | 2 | 2.14 | 0.93 | 242.0 | 34.5 | 1.3 | 28.6 |

Comments and Conclusion

Figure 1:
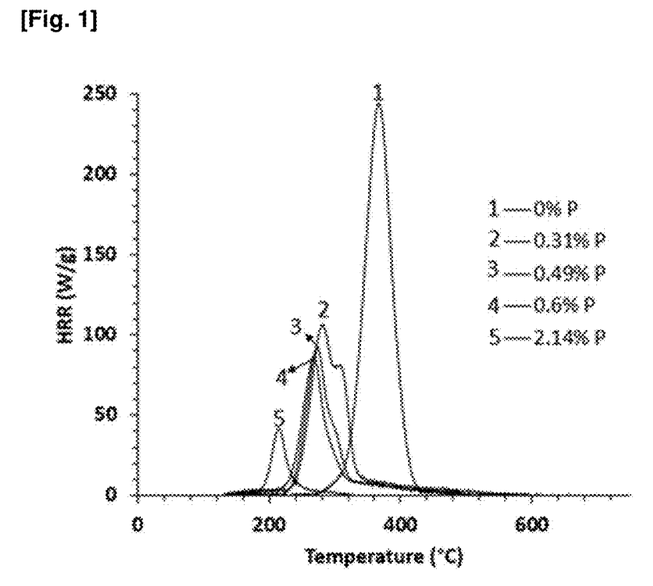
FIG. 1 shows different curves of heat release rate ("HRR") as a function of temperature for steam-exploded and bleached hemp fibers obtained with the pyrolysis combustion flow calorimeter (PCFC).

Table 1 is illustrated by FIG. 1. It may be observed that the higher the percentage of phosphorus grafted on the hemp fibers (2.14%), the lower the maximum value of the peak heat release rate (pHRR) (34.5 W/g) (as opposed to 248 W/g for non-flame-retarded control hemp fibers).

The same is true for the total heat release ("THR") which is 1.3 kJ/g for hemp fibers with a phosphorus grafting of 2.14% as opposed 13.8 kJ/g for the non-flame retarded control hemp fibers.

Conversely, the higher the percentage of phosphorus grafted onto the hemp fibers, the higher the percentage of charred residue after the flame-retarded lignocellulosic material was burned.

Figure 2:
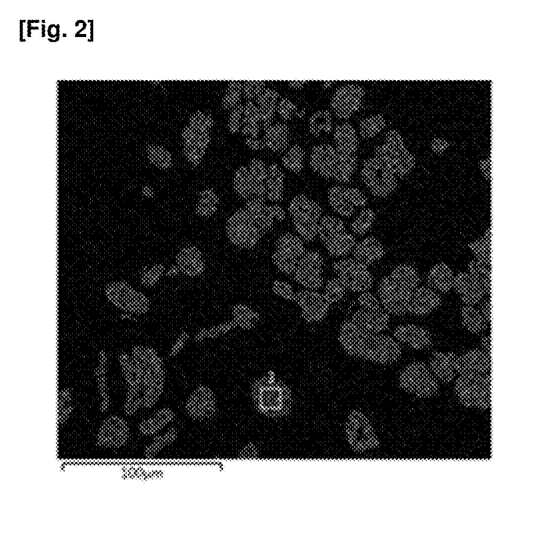
FIG. 2 is phosphorus mapping for steam-exploded and bleached hemp fibers, flame-retarded according to the process of the invention.

FIG. 2 shows that phosphorus is uniformly distributed on the surface and in the core of the steam-exploded and flame-retarded hemp fibers.

The hemp fibers flame-retarded according to the process of the invention, when ignited, thus give off much less heat than non-flame-retarded hemp fibers, and they char much more.

The test described above is repeated a second time, under the conditions described above, but this time using the seven aqueous impregnation solutions comprising commercial phytic acid.

10 g of hemp fibers, exploded and bleached according to the conditions defined above, are impregnated in 100 mL of each of the seven aqueous solutions of phytic acid (Sigma-Aldrich) and urea as defined in Example 1, without stirring, for one hour at room temperature.

The results are given in Table 2 below.

Comments and Conclusion

Figure 3:
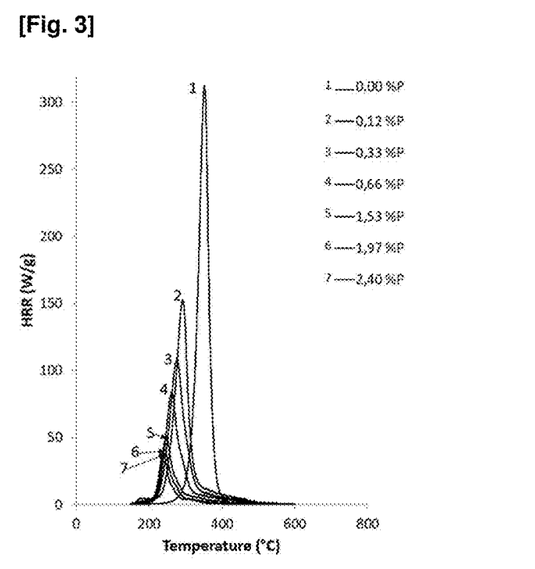
FIG. 3 shows different curves of heat release rate ("HRR") as a function of temperature for exploded and bleached hemp fibers obtained with the pyrolysis combustion flow calorimeter (PCFC).

Table 2 is illustrated by FIG. 3. It may be observed that the higher the percentage of phosphorus grafted on the hemp fibers (2.40%), the lower the maximum value of the peak heat release rate (pHRR) (39.2 W/g) (as opposed to 312 W/g for non-flame-retarded control hemp fibers).

The same is true for the total heat release ("THR") which is 1.7 kJ/g for hemp fibers with a phosphorus grafting of 2.40% as opposed 12.7 kJ/g for the non-flame retarded control hemp fibers.

Conversely, the higher the percentage of phosphorus grafted onto the hemp fibers, the higher the percentage of charred residue after the flame-retarded lignocellulosic material was burned.

The hemp fibers flame-retarded according to the process of the invention, when ignited, thus give off much less heat than non-flame-retarded hemp fibers, and they char much more.

Note

Some variations in the content of phosphorus grafted onto hemp fibers are noted between Tables 1 and 2, whereas the concentrations of phytic acid in the aqueous impregnation solutions are the same. These variations may be explained by the different origin of the phytic acid used (rapeseed oil cake as opposed to commercial origin). In addition, hemp fibers are natural fibers which have variabilities in their morphology.

However, despite these differences, satisfactory grafting of phosphorus onto the hemp fibers is observed in all cases, which increases as the percentage of phytic acid present in the impregnation solution increases, which shows the efficiency of the flame retardancy process of the invention.

Example 3

Process for the Flame Retardancy of Steam-Exploded but Unbleached Hemp Fibers

This example is a comparative example of Example 2. In this example, the hemp fibers have only been treated by steam explosion and have not been bleached. The exploded and unbleached hemp fibers are flame-retarded according to the process of the invention, using, respectively, the seven aqueous solutions of phytic acid (commercial—Sigma-Aldrich) and urea as defined in Example 1.

The results obtained are given in Table 3 below.

TABLE 2

| Phytic acid m/m | Urea m/m | % P | % N | PCFC | | | | Fire test | | |
| | | | | pHRR W/g | TpHRR ° C. | THR kJ/g | % residue | Ignition | Propagation | Self-extinction |
|---|---|---|---|---|---|---|---|---|---|---|
| 0.00 | 0 | 0.00 | 0.05 | 312.0 | 351.6 | 12.7 | 5 | Yes | Yes | No |
| 0.32 | 1 | 0.12 | 0.28 | 152.1 | 292.9 | 8.3 | 16 | Yes | Yes | No |
| 0.63 | 2 | 0.33 | 0.48 | 108.2 | 276.5 | 6.7 | 22 | Yes | Yes | No |
| 1.57 | 5 | 0.66 | 0.85 | 83.75 | 262.3 | 4.9 | 24 | Yes | Yes | Yes |
| 3.13 | 10 | 1.53 | 1.26 | 50.00 | 247.0 | 2.9 | 35 | Yes | No | — |
| 4.70 | 15 | 1.97 | 1.42 | 41.26 | 241.8 | 2.1 | 35 | No | No | — |
| 6.26 | 20 | 2.40 | 1.48 | 39.20 | 238.4 | 1.7 | 36 | No | No | — |

TABLE 3

| Phytic acid m/m | Urea m/m | % P | % N | PCFC | | | | Fire test | | |
|---|---|---|---|---|---|---|---|---|---|---|
| | | | | pHRR W/g | TpHRR ° C. | THR kJ/g | % residue | Ignition | Propagation | Self-extinction |
| 0.00 | 0 | 0.07 | <0.05 | 300.8 | 358.6 | 12.4 | 7 | Yes | Yes | No |
| 0.32 | 1 | 0.15 | 0.05 | 260.9 | 322.0 | 11.1 | 8 | Yes | Yes | No |
| 0.63 | 2 | 0.24 | 0.31 | 180.4 | 296.9 | 8.90 | 12 | Yes | Yes | No |
| 1.57 | 5 | 0.53 | 0.66 | 86.30 | 266.1 | 5.40 | 12 | Yes | Yes | Yes |
| 3.13 | 10 | 0.93 | 0.78 | 57.80 | 255.9 | 3.40 | 29 | | No | — |
| 4.70 | 15 | 1.48 | 1.07 | 46.30 | 250.5 | 2.30 | 36 | No | No | — |
| 6.26 | 20 | 1.83 | 1.40 | 42.90 | 237.6 | 2..30 | 34 | No | No | — |

Comments and Conclusion

Figure 4:
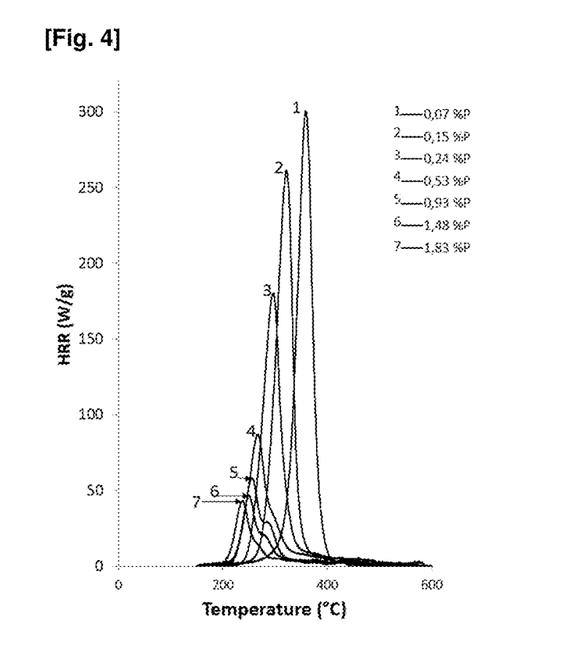
FIG. 4 shows different curves of heat release rate ("HRR") as a function of temperature for exploded and unbleached hemp fibers obtained with the pyrolysis combustion flow calorimeter (PCFC).

Table 3 is illustrated by FIG. 4. The same observations may be made for the exploded unbleached (flame-retarded) hemp fibers as for the exploded bleached (flame-retarded) hemp fibers, namely: the higher the percentage of phosphorus grafted onto the hemp fibers (1.83%), the lower the maximum value of the peak heat release rate (pHRR) (42.90 W/g) (as opposed to 300.8 W/g for the control exploded (not flame-retarded) hemp fibers.

The same is true for the total heat release ("THR"), which is 2.30 kJ/g for exploded hemp fibers with a phosphorus grafting of 1.83% as opposed to 12.4 kJ/g for the control exploded hemp fibers (not flame-retarded).

Conversely, the higher the percentage of phosphorus grafted onto the hemp fibers, the higher the percentage of charred residue after the flame-retarded lignocellulosic material was burned.

For the same amount of phytic acid used (3.13%), there is a greater decrease in the peak HRR of the exploded and bleached hemp fibers (50.00 W/g as opposed to 57.80 W/g for the exploded and unbleached hemp fibers). This decrease is accompanied by a shift in the peak temperature and total heat release. The same is true for the different phytic acid levels, thus showing a greater decrease in the peak HRR, pHRR temperature and total heat release for exploded and bleached (flame-retarded) hemp fibers than for exploded and unbleached (flame-retarded) hemp fibers.

However, it is noted that the results obtained according to Example 2 are even better than those of Example 3 (see the data in Tables 2 and 3, respectively). It may thus be concluded that, for hemp fibers, the prior steam explosion step, followed by the bleaching step, improves the efficiency of the flame retardancy process of the invention.

Example 4

Process for the Flame Retardancy of Hemp Fibers which have not been Subjected to Steam Explosion or Bleaching In this example, the hemp fibers have not undergone any prior steam explosion or bleaching treatment. The raw, i.e. unexploded and unbleached, hemp fibers are flame-retarded according to the process of the invention, using, respectively, four aqueous solutions of phytic acid (commercial—Sigma-Aldrich) and urea as defined in Example 1, which comprise 0.00%, 1.57%, 3.13% and 6.26% phytic acid.

The results obtained in terms of thermal properties are given in Table 4 below.

TABLE 4

| | | Cooking | Raw hemp | | | |
|---|---|---|---|---|---|---|
| % phytic acid | % urea | time (h) | TpHRR (° C.) | pHRR (W/g) | THR (kJ/g) | % residue |
| 0 | 0 | 0 | 357 | 148.0 | 11.6 | 14 |
| 1.57 | 5 | 2 | 276.1 | 131.7 | 7.0 | 20 |
| 3.13 | 10 | 2 | 258.2 | 78.0 | 4.4 | 29 |
| 6.26 | 20 | 2 | 260.3 | 45.6 | 2.5 | 33 |

Comments and Conclusion

Figure 5:
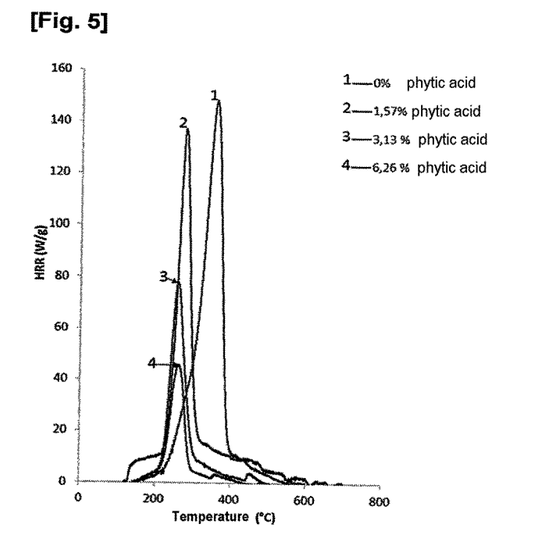
FIG. 5 shows different curves of heat release rate ("HRR") as a function of temperature for raw (i.e. unexploded and unbleached) hemp fibers obtained with the pyrolysis combustion flow calorimeter (PCFC).

Table 4 is illustrated by FIG. 5. The same observations may be made for the raw (unexploded, unbleached) flame-retarded hemp fibers (Example 4) as for the flame-retarded, exploded, unbleached hemp fibers (Example 3) and the flame-retarded, exploded, bleached hemp fibers (Example 2). These observations are as follows: the higher the percentage of phytic acid used on the hemp fibers (6.26%) (and thus the higher the level of phosphorus grafted onto the fibers), the lower the maximum value of the peak heat release rate (pHRR) (45.60 W/g) (as opposed to 148.0 W/g for the control exploded hemp fibers (0% phytic acid)).

The same is true for the total heat release ("THR"), which is 2.5 kJ/g for exploded hemp fibers flame-retarded with 6.26% phytic acid as opposed to 11.6 kJ/g for control exploded hemp fibers (0% phytic acid).

Conversely, the higher the percentage of phytic acid used on the hemp fibers, the higher the percentage of charred residue after the flame-retarded lignocellulosic material was burned.

In conclusion, it has been shown in Examples 2, 3 and 4 (see Tables 2 to 4 and FIGS. 3 to 5) that the flame retardancy process of the invention is effective not only on raw, i.e. unexploded and unbleached, plant fibers (Example 4), and on exploded and unbleached plant fibers (Example 3), but also on exploded and bleached plant fibers (Example 2).

Example 5

Demonstration of the Advantages of the Steam Explosion Treatment and Bleaching on Hemp Fibers to be Flame-Retarded This example is a comparison of Examples 2, 3 and 4. In this example, the raw hemp fibers (unexploded and unbleached), the exploded and unbleached hemp fibers (Example 3) and the exploded and bleached hemp fibers (Example 2), are flame-retarded according to the process of the invention, using the same aqueous solution of 3.13% phytic acid and 10% urea as defined in Example 1.

The comparison of the results obtained in terms of thermal properties is given in Table 5 below.

TABLE 5

| Hemp fibers | TpHRR (° C.) | pHRR (W/g) | THR (kJ/g) | % residue |
|---|---|---|---|---|
| Raw (unexploded and unbleached) | 258.2 | 78.0 | 4.4 | 29 |
| Exploded but unbleached | 255.9 | 57.8 | 3.4 | 29 |
| Exploded and bleached | 247.0 | 50.00 | 2.9 | 35 |

Comments and Conclusion

Figure 6:
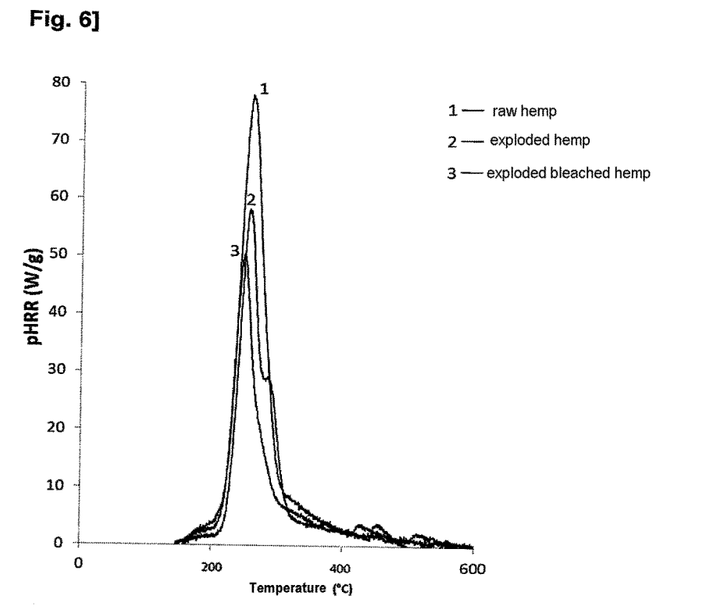
FIG. 6 shows different curves of heat release rate (HRR) as a function of temperature obtained with the pyrolysis combustion flow calorimeter (PCFC) for raw (i.e. unexploded and unbleached) flame-retarded hemp fibers, for exploded and unbleached flame-retarded hemp fibers, and for exploded and bleached flame-retarded hemp fibers. These fibers are all flame-retarded with the same phytic acid content (3.13%).

The results in Table 5 are illustrated by FIG. 6. For the same level of phytic acid used (3.13%), a greater decrease in the peak HRR of the exploded and bleached hemp fibers is noted (50 W/g as opposed to 57.8 W/g for the exploded hemp fibers and 78 W/g for the raw hemp fibers). This decrease is accompanied by a shift in the peak temperature and the total heat release. The same observation is made for the different phytic acid levels, thus showing a greater decrease in peak HRR, pHRR temperature and total heat release for the exploded and bleached (flame-retarded) hemp fibers than for the exploded and unbleached (flame-retarded) hemp fibers and for the raw (unexploded and unbleached) (flame-retarded) hemp fibers.

In conclusion, the flame retardancy process of the invention is effective not only on raw, i.e. unexploded and unbleached, plant fibers, and on exploded and unbleached plant fibers, but also on exploded and bleached plant fibers.

Thus, the steam explosion step followed by the bleaching step improves the efficiency of the flame retardancy process of the invention.

Example 6

Process for the flame retardancy of spruce particles by soaking

Materials

The phytic acid used in this example is the product sold by the company Sigma-Aldrich under the name "phytic acid solution", as defined in Example 1 (solution having a density of 1.432 g/mL and a mass concentration of phytic acid of 50%). The urea granules of purity used are the same as in Example 1.

The concentrated sulfuric acid, used in the steam explosion process, is sold by the company Sigma-Aldrich and is mixed with demineralized water to prepare a concentration of 2% by mass.

Preparation of an Aqueous Solution of Phytic Acid and Urea

The aqueous impregnation solution is prepared by mixing 30 g of urea, 13 mL of a commercial aqueous phytic acid solution and 100 mL of distilled water.

The aqueous impregnation solution thus obtained comprises 6.26% by mass of phytic acid and 20% by mass of urea relative to the total mass of the aqueous solution.

Steam Explosion Treatment of Spruce Fibers

Particles of spruce heartwood (2 to 5 mm in diameter) are placed in a 2% sulfuric acid solution (2% by mass in water), in a solid/liquid ratio of 1/5 for 4 hours at room temperature and without stirring. The steam explosion is performed at a temperature of 200° C. for a residence time of 5 min. Following the explosion, the exploded spruce particles are washed with water.

Grafting of Phytic Acid According to the Process of the Invention

The exploded spruce particles (80 g) are impregnated for one hour, by soaking in 400 mL of the previously prepared aqueous solution of phytic acid and urea (comprising 6.26% phytic acid and 20% urea). The spruce particles are air-dried at room temperature for 18 hours and then placed in an oven at 150° C. for 2 hours.

The spruce particles are then characterized by means of the techniques previously described and notably by combustion microcalorimetry (PCFC: "Pyrolysis Combustion Flow calorimetry") and by the flame test.

The results obtained are described in Table 6 below.

TABLE 6

| Phytic acid (m/m) | Cooking time (hours) | % P | % N | TpHRR (° C.) | pHRR (W/g) | THR (kJ/g) | % residue |
|---|---|---|---|---|---|---|---|
| Curve 1 0.00 (exploded) | 0 | 0.00 | 0.00 | 381 | 167 | 11.95 | 15.2 |
| Curve 2 0.00 (exploded, dried and cooked) | 2 | 0.00 | 0.00 | 381 | 164 | 12.50 | 15.4 |
| Curve 3 6.26 (exploded and flame-retarded) | 2 | 2.14 | 0.93 | 280 | 55 | 4.05 | 34.3 |

Comments and Conclusion

Figure 7:
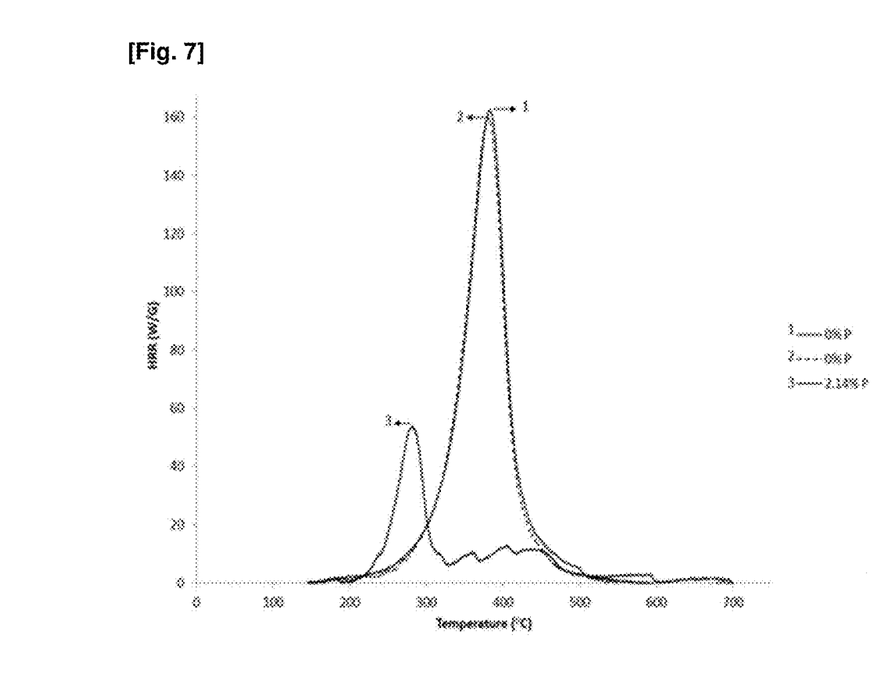
FIG. 7 shows different curves of heat release rate ("HRR") as a function of temperature for spruce particles obtained with the pyrolysis combustion flow calorimeter (PCFC).

Table 6 is illustrated by FIG. 7. The heat release rate is approximately the same for the exploded spruce particles (curve 1) and the exploded, dried and cooked, but non-impregnated spruce particles (curve 2).

The flame retardancy treatment of the invention on the previously steam-exploded spruce particles drastically decreases the maximum value of the peak heat release rate (pHRR) (55 W/g) (as opposed to 167 W/g and 164 W/g for the exploded spruce particles (curve 1) and the exploded, dried and cooked but non-impregnated spruce particles (curve 2), respectively).

The same is true for the total heat release ("THR"), which is 4.05 kJ/g for the exploded and flame-retarded spruce particles with a phosphorus grafting of 2.14% as opposed to 11.95 kJ/g for the exploded spruce particles (curve 1) and 12.50 kJ/g for the exploded, dried and cooked but non-impregnated spruce particles (curve 2). Conversely, the percentage of charred residue after the flame-retarded lignocellulosic material was burned increases to 34.3% for the exploded and flame-retarded spruce particles as opposed to 15.2% for the exploded spruce particles (curve 1) and 15.4% for the exploded, dried and cooked but non-impregnated spruce particles (curve 2).

The spruce particles that are flame-retarded according to the process of the invention, when ignited, thus give off much less heat than the spruce particles that are not flame-retarded and char much more.

Example 7

Process for the Flame Retardancy of Spruce Particles by Spraying

This example is a comparative example of Example 6. The conditions of this example are those described in Example 6, the difference residing in the step of impregnation of the exploded spruce particles (80 g), which is performed by spraying (and not by soaking) with 160 mL of an aqueous solution comprising 10% phytic acid and 10% urea.

The spruce particles thus impregnated are directly (without drying) placed in an oven at 150° C. for 30 minutes (instead of 2 hours in Example 6).

As already mentioned, when impregnation is performed by spraying, no drying is required before spraying.

Note: In Example 6, 400 mL of an aqueous impregnation solution comprising 6.26% phytic acid and 20% urea are used. This means that 25.04 g of phytic acid (6.26×400/100) and 80 g of urea (20×400/100) are used for the soaking impregnation step.

In the present example (spray impregnation), 160 mL of an aqueous impregnation solution comprising 10% phytic acid and 10% urea are used. This means that 16 g of phytic acid (10×160/100) and 16 g of urea (10×160/100) are used for the spray impregnation step.

The amounts of phytic acid and urea are thus lower in the spray impregnation step than in the soaking impregnation step.

The results obtained in terms of thermal properties are given in Table 7 below.

TABLE 7

| Phytic acid (%) | Cooking time (minutes) | TpHRR (° C.) | pHRR (W/g) | THR (kJ/g) | % residue |
|---|---|---|---|---|---|
| Curve 1 0% (exploded) (control) | 0 | 381 | 167 | 11.95 | 15.2 |
| Curve 2 6.26% (exploded and sprayed) | 30 | 292.2 | 83.5 | 7.3 | 29.7 |
| Curve 3 6.26% (exploded and soaked) | 120 | 280 | 55 | 4.05 | 34.3 |

Comments and Conclusion

Figure 8:
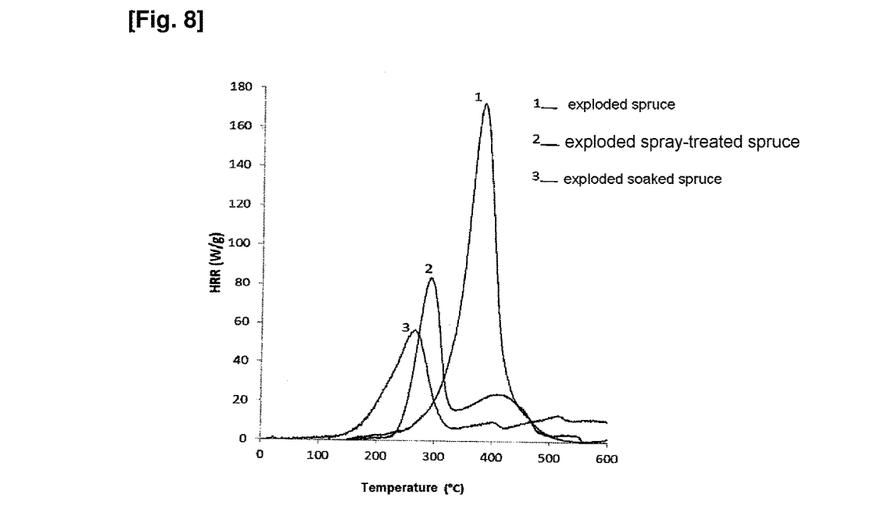
FIG. 8 shows different curves of heat release rate ("HRR") as a function of temperature for spruce particles obtained with the pyrolysis combustion flow calorimeter (PCFC).

Table 7 is illustrated by FIG. 8. Although the amount of phytic acid used by spraying is significantly lower than with soaking (−36%), the HRR curves in PCFC in FIG. 8 show an efficiency indicated by a significant drop in the pHRR values from 167 W/g (control) to 83.5 W/g accompanied by a shift to lower temperatures (381° C. as opposed to 292.2° C.).

The same is true for the total heat release (THR), which is 11.95 kJ/g for untreated spruce particles as opposed to 7.3 kJ/g for the particles flame-retarded by spraying. Conversely, for spray-treated particles, the percentage of charred residue after flame retardancy is twice that of the untreated particles.

In conclusion, the HRR curves in PCFC in FIG. 8 show the efficiency of spraying the flame-retardant solution on the flame retardancy of spruce particles, even though the amounts of phosphorus are lower with spraying.

The spray impregnation step of the flame retardancy process of the invention significantly reduces the amount of reagents used while maintaining good thermal properties.

Example 8

Covalent Grafting of Phytic Acid onto Flame-Retarded Lignocellulosic Material

Figure 9:
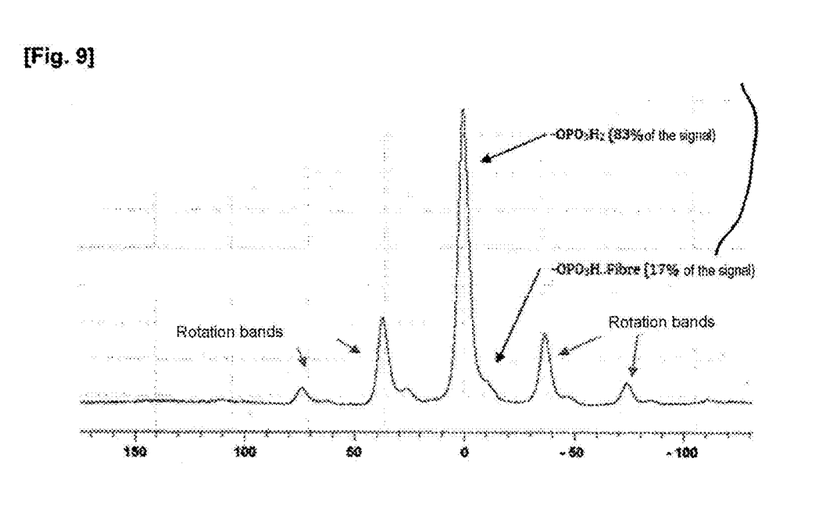
FIG. 9 is a $^{31}P$ NMR spectrum of hemp fibers grafted to phosphorus by covalent bonding.

As previously described, the grafting of phytic acid onto the lignocellulosic material is covalent in nature (strong and durable bond). The covalent grafting onto the hemp fibers advantageously withstands successive washes with water. This grafting was able to be confirmed by solid-state NMR (see FIG. 9) with the detection of a signal with a shoulder attributed to the grafted phosphate group (ratio 1/6). Confirmation was able to be made by measuring the relaxation times of the phosphorus atoms (P1=6.8 seconds, P2=10.9 seconds). The higher relaxation time for grafted P2 is explained by a lower mobility.

The present disclosure is not limited to the examples that have been described above, purely for illustrative purposes, but includes all the variants that can be envisaged by a person skilled in the art in the context of the protection sought.

LIST OF CITED DOCUMENTS

Non-Patent Literature

For all intents and purposes, the following non-patent item(s) are cited:
(1): Yang Zhou et al., Carbohydrate Polymers, 115 (2015) 670-676;
(2): Lucie Costes et al., European Polymer Journal, 74 (2016) 218-228;
(3): Yu-Yang Gao et al., Polymer Degradation and Stability, 161 (2019) 298-308; and
(4): Xiao-hui Liu et al., Cellulose, 25, 799-811 (2018).

The invention claimed is:

1. A process for preparing a biobased flame-retarded lignocellulosic material from biobased lignocellulosic material, comprising the following steps:
   optionally steam exploding and/or bleaching the biobased lignocellulosic material,
   impregnating the biobased lignocellulosic material, optionally steam-exploded and/or bleached, in or with an aqueous solution consisting of: from 0.5% to 7% phytic acid and from 1% to 22% urea, said percentages being expressed by mass relative to the total mass of the aqueous solution, with a balance of the aqueous solution being water,
   optionally drying the impregnated biobased lignocellulosic material until it has a moisture content ranging from 5% to 20%, said percentages being expressed by mass relative to the total mass of the impregnated biobased lignocellulosic material,
   cooking the impregnated and optionally dried biobased lignocellulosic material,
   the biobased flame-retarded lignocellulosic material thus obtained comprising a content of phosphorus originating from phytic acid ranging from 0.1% to 10%, said percentages being expressed by mass relative to the total mass of the biobased flame-retarded lignocellulosic material,
   wherein said biobased flame-retarded lignocellulosic material consists of said biobased lignocellulosic material impregnated in or with the aqueous solution, and said biobased lignocellulosic material has not undergone any chemical treatment other than optionally steam exploding and/or bleaching.

2. The process as claimed in claim 1, wherein the biobased lignocellulosic material is in a form selected from the group consisting of plant fibers, wood fibers, wood particles, and mixtures thereof.

3. The process as claimed in claim 2, wherein:
the plant fibers are bast fibers selected from the group consisting of hemp, flax, ramie and jute fibers, and
the wood fibers and/or the wood particles are from wood selected from the group consisting of spruce, ash, birch, poplar, beech and oak.

4. The process as claimed in claim 2, wherein the biobased lignocellulosic material is in the form of bast fibers.

5. The process as claimed in claim 1, wherein the biobased lignocellulosic material is steam exploded and is selected from the group consisting of steam-exploded plant fibers, steam-exploded wood fibers, steam-exploded wood particles, and combinations thereof.

6. The process as claimed in claim 5, wherein the steam-exploded plant fibers, have a diameter of less than 100 μm and a length ranging from 1 cm to 10 cm.

7. The process as claimed in claim 5, wherein the biobased lignocellulosic material is steam-exploded bast fibers.

8. The process as claimed in claim 1, wherein the biobased lignocellulosic material is bleached.

9. The process as claimed in claim 1, wherein the phytic acid used is obtained from a rapeseed oil cake.

10. The process as claimed in claim 1, wherein the step of impregnating the biobased lignocellulosic material is performed at room temperature:
by soaking in the aqueous solution of phytic acid and urea, or
by spraying with the aqueous solution of phytic acid and urea.

11. The process as claimed in claim 10, wherein the step of impregnating the biobased lignocellulosic material is performed at room temperature by soaking in the aqueous solution of phytic acid and urea, and the impregnated biobased lignocellulosic material is subjected to the step of drying before the step of cooking.

12. The process as claimed in claim 1, wherein the step of drying of the impregnated biobased lignocellulosic material is performed at a temperature ranging from 20° C. to 60° C., for a time ranging from 5 minutes to 18 hours.

13. The process as claimed in claim 1, wherein the step of cooking of the impregnated and optionally dried biobased lignocellulosic material is performed at a temperature ranging from 140° C. to 200° C., for a time ranging from 15 minutes to 5 hours.

14. The process as claimed in claim 1, wherein, in the biobased flame-retarded lignocellulosic material, the phosphorus originating from the phytic acid is grafted by covalent bonding to the surface and to the core of said biobased flame-retarded lignocellulosic material.

15. The method as claimed in claim 1, wherein the biobased flame-retarded lignocellulosic material obtained comprises a content of phosphorus originating from phytic acid ranging from 0.3% to 3%, said percentages being expressed by mass relative to the total mass of the flame-retarded biobased lignocellulosic material.

16. A method of manufacturing flame-retarded composite materials based on plant fibers, flexible flame-retarded woven or nonwoven materials based on plant fibers, or flame-retarded materials based on wood fibers and/or wood particles, comprising providing the biobased flame-retarded lignocellulosic material as obtained according to the process claim 1, wherein the biobased lignocellulosic material from which the biobased flame-retarded lignocellulosic material is prepared is plant fibers or wood fibers and/or wood particles.

17. The method as claimed in claim 16, wherein the flame-retarded composite materials are flame-retarded wood panels, and the biobased flame-retarded lignocellulosic material is obtained from steam-exploded wood fibers and/or steam-exploded wood particles, and the flame-retarded wood panels obtained are free of glue and resin.

18. The method as claimed in claim 16, wherein the flame-retarded composite materials are flame-retarded textiles, the biobased flame-retarded lignocellulosic material is obtained from plant fibers.

* * * * *